US008677562B2

(12) United States Patent
Vallance

(10) Patent No.: US 8,677,562 B2
(45) Date of Patent: Mar. 25, 2014

(54) MOVEMENTS CONTROLLING MEANS

(76) Inventor: William Ernest Taylor Vallance, Marlow (GB)

( * ) Notice: Subject to any disclaimer, the term of this patent is extended or adjusted under 35 U.S.C. 154(b) by 0 days.

(21) Appl. No.: 13/039,858

(22) Filed: Mar. 3, 2011

(65) Prior Publication Data

US 2011/0191982 A1 Aug. 11, 2011

Related U.S. Application Data

(63) Continuation-in-part of application No. 10/555,229, filed as application No. PCT/GB2004/001790 on Apr. 23, 2004, now abandoned.

(30) Foreign Application Priority Data

May 2, 2003 (GB) .................................. 0310185.4

(51) Int. Cl.
*E05F 5/02* (2006.01)
*F16F 9/34* (2006.01)

(52) U.S. Cl.
USPC ........ 16/82; 16/71; 16/83; 220/827; 220/810; 188/266.3

(58) Field of Classification Search
USPC ........... 217/60 D; 297/463.1; 188/266.3, 290, 188/268, 67; 220/264, 263, 262, 260, 827, 220/810
See application file for complete search history.

(56) References Cited

U.S. PATENT DOCUMENTS

| | | | | | |
|---|---|---|---|---|---|
| 1,035,298 | A | | 8/1912 | Aspegren | |
| 2,527,933 | A | * | 10/1950 | Jakeway | 217/60 E |
| 2,598,560 | A | * | 5/1952 | Kenyon | 16/193 |
| 2,723,776 | A | * | 11/1955 | Jacobson | 217/60 D |
| 2,775,317 | A | * | 12/1956 | Sinisterra | 188/268 |
| 2,842,278 | A | * | 7/1958 | Murphy | 217/60 D |
| 2,869,700 | A | * | 1/1959 | Bowden | 192/69.81 |
| 2,890,480 | A | * | 6/1959 | Gregg et al. | 16/197 |
| 2,955,854 | A | * | 10/1960 | Walton | 403/107 |
| 2,969,560 | A | * | 1/1961 | Pierie et al. | 16/49 |
| 3,276,762 | A | * | 10/1966 | Thomas | 267/154 |
| 3,436,973 | A | | 4/1969 | Aweimrine | |
| 3,602,340 | A | * | 8/1971 | Budzich et al. | 188/67 |
| 3,915,261 | A | * | 10/1975 | Jett et al. | 188/67 |
| 4,051,929 | A | * | 10/1977 | Parfitt | 188/196 C |
| 4,540,148 | A | * | 9/1985 | Jann | 248/406.2 |
| 4,782,715 | A | * | 11/1988 | Chevance | 74/89.39 |
| 4,799,734 | A | * | 1/1989 | Periou | 297/362.14 |
| 5,109,571 | A | * | 5/1992 | Ohshima et al. | 16/307 |
| 5,152,032 | A | | 10/1992 | Davis et al. | |
| 5,165,507 | A | * | 11/1992 | Ohshima | 188/290 |

(Continued)

FOREIGN PATENT DOCUMENTS

| | | | | | |
|---|---|---|---|---|---|
| DE | 299 07 099 | U | | 7/1999 | |
| DE | 201 07 068 | U | | 8/2001 | |
| EP | 1300328 | A1 | * | 4/2003 | B62K 21/08 |

*Primary Examiner* — Victor Batson
*Assistant Examiner* — Emily Morgan
(74) *Attorney, Agent, or Firm* — Tarolli, Sundheim, Covell & Tummino LLP

(57) ABSTRACT

An apparatus for controlling movement of a first member relative to a second member in a piece of furniture includes a damper. When relative movement occurs between the first and second members, force is transmitted through a clutch drive mechanism to a movable member in the damper. A viscous damping medium in the damper resists movement of the movable member.

11 Claims, 6 Drawing Sheets

(56) References Cited

U.S. PATENT DOCUMENTS

| | | | | |
|---|---|---|---|---|
| 5,257,680 | A * | 11/1993 | Corcoran et al. | 188/129 |
| 5,383,303 | A * | 1/1995 | Nakanishi et al. | 49/181 |
| 6,115,884 | A * | 9/2000 | DeJong et al. | 16/197 |
| 6,681,905 | B2 * | 1/2004 | Edmondson et al. | 188/267.2 |
| 6,755,287 | B2 * | 6/2004 | Hadden et al. | 188/290 |
| 2002/0003076 | A1 * | 1/2002 | Taylor | 192/64 |
| 2003/0062229 | A1 * | 4/2003 | Mengoli | 188/290 |
| 2004/0099494 | A1 * | 5/2004 | Hadden et al. | 188/290 |
| 2005/0103578 | A1 * | 5/2005 | Weiss | 188/67 |
| 2006/0131111 | A1 * | 6/2006 | Nakanishi et al. | 188/67 |
| 2006/0169555 | A1 * | 8/2006 | Doornbos | 188/290 |
| 2007/0108000 | A1 * | 5/2007 | Derr et al. | 188/290 |

* cited by examiner

MOVEMENTS CONTROLLING MEANS

RELATED APPLICATION

This application is a Continuation-in-Part of U.S. patent application Ser. No. 10/555,229 filed Dec. 7, 2006 now abandoned by William Ernest Taylor Valiance and entitled Movements Controlling Means. The aforementioned U.S. patent application Ser. No. 10/555,229 was filed on Apr. 23, 2004 as International Application No. PCT/GB2004/001790. The aforementioned United States Patent Application was filed on May 2, 2003 in the United Kingdom as Application Serial No. 0310185.4. The benefit of the earlier filing date of the aforementioned U.S. patent application Ser. No. 10/555,229 and the aforementioned foreign applications are hereby claimed. The aforementioned U.S. patent application Ser. No. 10/555,229 is hereby incorporated herein in its entirety by this reference thereto.

BACKGROUND OF THE INVENTION

This invention relates to movement controls, and in particular to devices for providing damped control of movable furniture parts such as lids, doors and drawers and drop-down flaps.

It is known to provide a stay for the lid of a piece of furniture such as a linen chest, which acts upon opening of the lid to hold it in an open position and which can be de-activated to allow the lid to close. Some such stays also feature a friction mechanism, which may be adjustable, which is designed to act as a brake to stop the lid from slamming shut.

SUMMARY OF THE INVENTION

The present invention aims to improve upon existing movement controls and provides an assembly for controlling movement of a first member relative to a second member in a piece of furniture, said assembly comprising a rotary shear damper having first and second elements mounted for rotation relative to one another with a viscous substance interposed therebetween to provide damping resistance to said relative rotational movement between the elements, the damper being connected to the first member, and drive means connected between the second member and the damper such that movement of the second member in at least one direction relative to the first member causes rotary movement of the damper thereby to impart a damping resistance to said movement of the second member, the drive means comprising a first element having a helically extending camming track and a second element having a cm follower to engage and follow said camming track, with the camming track having a pitch defined as the distance in the direction of movement of the second member between successive twists of the camming track, and with the cam follower being arranged to make driving contact with the camming track over a distance in the direction of movement of the second member of the less than the smallest pitch of the track.

BRIEF DESCRIPTION OF THE DRAWINGS

By way of example, embodiments of the invention will now be described with reference to the accompanying drawings, in which.

DESCRIPTION OF SPECIFIC PREFERRED EMBODIMENTS

Figure 1:
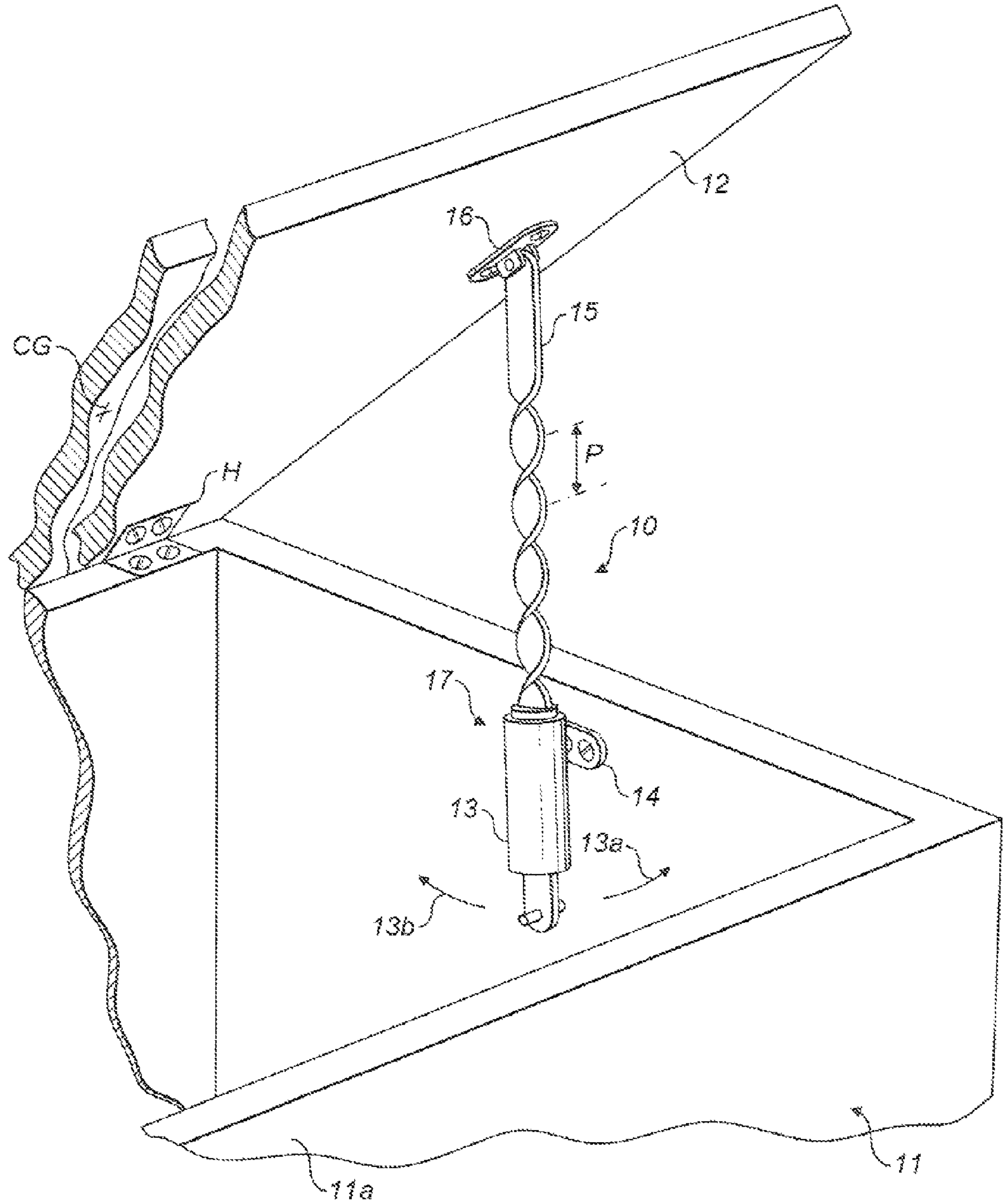
FIG. 1 illustrates a form of movement control assembly according to the invention in use on a piece of furniture.

FIG. 1 shows a piece of furniture, in this case a linen chest, with a movement control assembly 10 connected between the chest 11 and its hinged lid 12. The assembly 10 includes a damper 13 which is pivotally connected to the inside of the chest 11 by means of a suitable bracket 14. The movement control assembly 10 also includes an elongate bar 15, pivotally attached at one end to the lid 12 by means of a suitable bracket 16. The bar is linked to the damper 13 by means of a one-way clutched drive mechanism 17. As will be described in more detail below, movement of the bar 15 when the lid 12 closes causes rotary movement in the damper 13, which thereby imparts damping resistance to the closing movement of the lid.

A suitable damper 13 for use in such, an assembly is a so-called rotary shear damper. Rotary shear dampers are known in the, art and basically consist of one, part which is rotatably movable relative to another, with a viscous substance, such as silicone, between the two, parts to absorb energy when the parts rotate and hence provide resistance to the rotary movement, i.e. damping. Such dampers are available on the market as standard in a number of different sizes and designs and these are referred to herein generally as “rotary shear dampers”. The movement control assembly shown in FIGS. 1 to 4 is designed to work with a standard form or rotary shear damper. However, other forms of the rotary shear damper may be utilized if desired.

Figure 2:
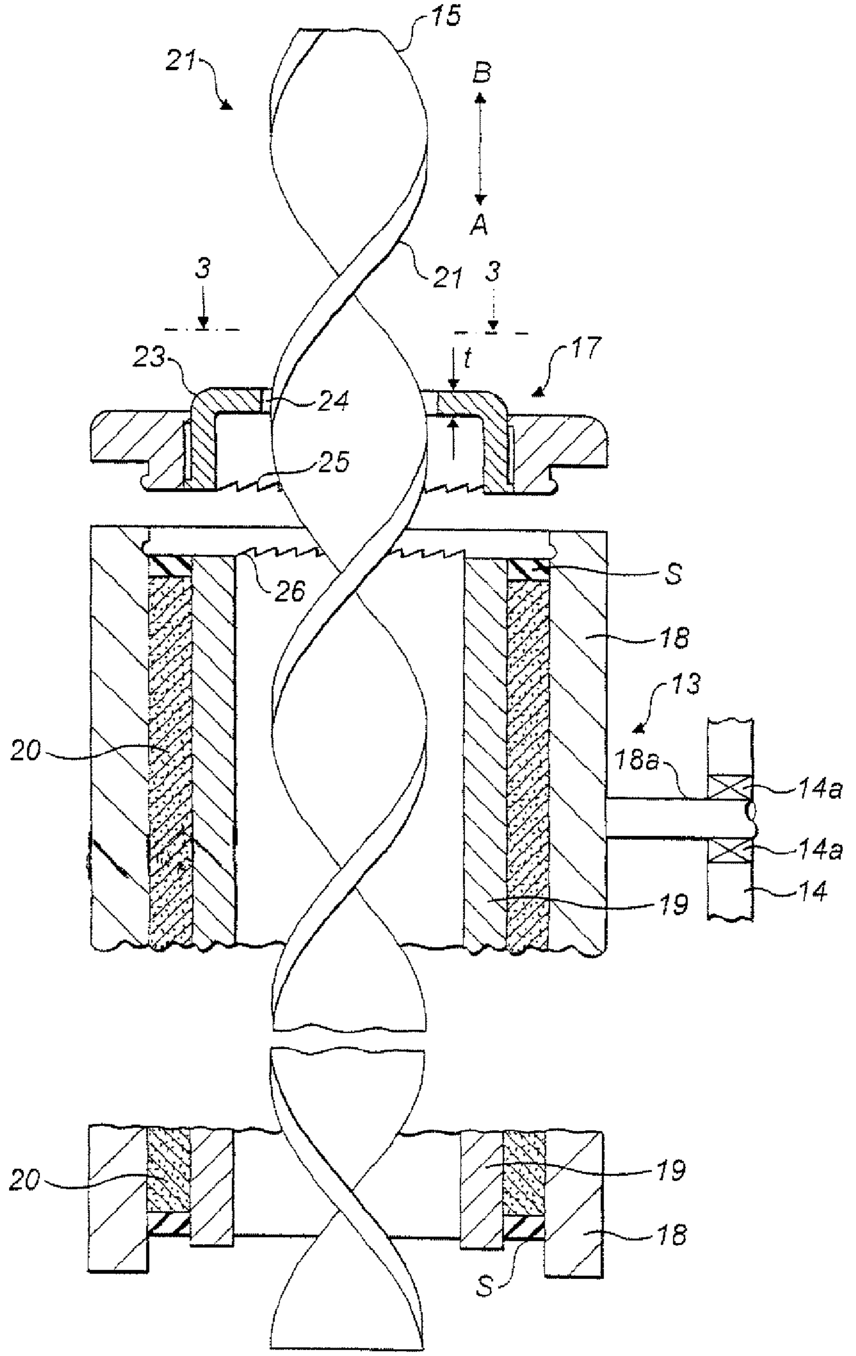
FIG. 2 is an enlarged fragmentary schematic illustration of a clutched drive mechanism and rotary sheer damper of the assembly of FIG. 1.

Looking now at FIG. 2, it will be seen that the rotary shear damper 13 in this example is in the form of an outer cylindrical casing 18 in which a cylindrical inner sleeve 19 is rotatably mounted. The energy-absorbing substance 20 is held in and fills the, sealed-off annulus between the two. The cylindrical casing 18 and cylindrical inner sleeve 19 are disposed in a coaxial relationship. A cylindrical inner side surface on the casing 18 cooperates with a cylindrical outer side surface on the inner sleeve 19 to at least partially form a cylindrical working chamber which has a uniform radial thickness throughout its axial extent. The outer casing 18 functions as a stator of the rotary shear damper 13. The inner sleeve 19 functions as a rotor of the rotary shear damper 13.

The upper (as viewed in FIG. 2) end portion of the working chamber is closed by an annular seal S. A similar seal S is provided to close the lower (as viewed in FIG. 2) end portion of the working chamber. The coaxial annular seals S are formed of a polymeric material. However the seals S may be formed of any desired material. The seals S are fixedly connected to the casing 18 and slidably engage the inner sleeve 19 to enable the inner sleeve to rotate relative to the casing.

The cylindrical working chamber formed between the stator or stationary casing 18 and rotatable rotor or inner sleeve 19 forms a shear space which is filled with a cylindrical body of the liquid viscous damping medium 20 which is an energy absorbing substance. The viscous damping medium 20 fills the cylindrical working chamber and provides resistance to relative rotation between the rotatable inner sleeve 19 and stationary casing 18. This resistance is generated by shearing of the viscous damping medium 20 during rotation of the inner sleeve 19 relative to the casing 18.

As was previously mentioned, the viscous damping medium 20 may be silicone. However, a damping medium 20 having a different composition may be used if desired. Although the damping medium 20 is a liquid, a particulate or a liquid particulate mixture may be used as the damping medium. The casing 18 and sleeve 19 are formed of metal. However, the stator 18 and/or rotor 19 may be formed of a polymeric material.

In the illustrated embodiment of the invention, the liquid damping medium 20 is disposed between two shear surfaces. Thus, the liquid damping medium 20 is disposed between a cylindrical inner side surface of the casing 18 and a cylindrical outer side surface of the sleeve 19. The cylindrical inner side surface of the casing 18 is disposed in a coaxial relationship with and is spaced apart from the cylindrical outer side surface of the sleeve 19. However, the damper 13 may be constructed with a greater number of surfaces between which a shearing action occurs. These surfaces may have a configuration other than the illustrated cylindrical configuration.

For example, both the cylindrical inner and outer sides of the sleeve 19 may be disposed in a working chamber formed by the casing 18 and exposed to the liquid damping medium. If this is done, the casing 18 would have a cylindrical radially inner side facing a cylindrical radially inner side of the sleeve 19. The casing 18 would also have a cylindrical radially outer side facing a cylindrical radially outer side of the sleeve 19. The radially inner and outer sides of the casing 18 and sleeve 19 would be exposed to the liquid damping medium in the working chamber. This would result in a first cylinder shear space being formed between the radially inner side of the casing 18 and the radially inner side of the sleeve 19. Similarly, a second cylindrical shear space would be formed between the radially outer side of the casing 18 and the racially outer side of the sleeve 19. Of course, all of the shear surfaces and shear spaces would be enclosed by the casing 18.

It is contemplated that the surfaces between which the shearing action occurs may have a configuration other than the illustrated cylindrical configuration. For example, the shearing action may occur between flat side surfaces. These flat side surfaces may be disposed in a parallel relationship and have one or more bodies of liquid damping medium disposed between them.

The elongate bar 15 formed from a flat strip of metal having a rectangular cross-section which has been formed with a series of helical twists 21. The helical twists on the bar 15 form a cam track. The bar 15 extends through and is coaxial with the clutched drive mechanism 17 and with the inner sleeve 19 of the damper 13. The clutched drive mechanism 17 is arranged to cause rotation of the inner sleeve 19 under the influence of force transmitted from the bar 15 to a circular clutch collar 23. The inner sleeve 19 rotates about the coincident central axes of the inner sleeve, casing 18, clutch collar 23, and bar 15.

Figure 3:
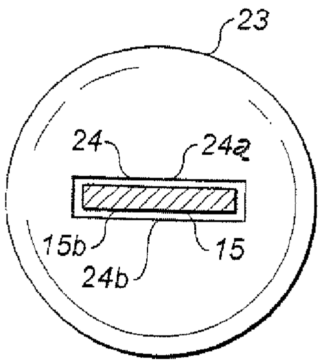
FIG. 3 is a fragmentary sectional view, taken along the line 3-3 of FIG. 2, illustrating a bar and collar of the assembly of FIG. 1, FIGS. 4*a* to 4*c* illustrate various modified forms of the assembly of FIG. 1.

The clutch collar 23 is made of thin-walled material, such as press formed metal, and has a slot 24 for slidably receiving the bar 15. As seen in FIG. 3, the slot 24 has a rectangular shape to match the cross-sectional shape of the bar 15. The slotted collar 23 forms a follower for the cam track provided by the helical twists on the bar 15. The collar 23 and bar 15 work together as a movement converter, i.e. a mechanism for converting the essentially linear movement of the bar into rotary movement of the collar, in the manner of a classic plunge-type drive mechanism of a child's spinning top.

The helically twisted surfaces of the bar 15 react against the inside faces of the slot 24 in the collar 23 to cause the rotational movement of the collar when the bar is moved longitudinally relative to it (in the direction of arrows A or B in FIG. 2). In this respect, the twists 21 of the bar 15 effectively define a camming track with a helical path, with the collar 23 effectively acting as a cam follower. The bar 15 is disposed in a coaxial relationship with the collar 23, casing 18, and sleeve 19.

Side surfaces **24*a* and 24*b* (FIG. 3) on the slot 24 engage helical twists 21 formed in the bar 15. Thus the flat side surface 24*a* of the slot 24 engages a helical side surface 15*a* on the bar 15. Similarly, a flat side surface 24*b* of the slot 24 engages a helical side surface 15*b* on the bar 15. When the bar 15 is moved in a downward direction (as viewed in FIG. 2 and indicated by the arrow A) during closing of the lid 19, the opposite side surfaces 15*a* and 15*b* (FIG. 3) on the bar 15 are pressed against the side surfaces 24*a* and 24*b* of the slot 24 to transmit drive forces from the bar to the collar 23. These drive forces push the collar 23 downward and are effective to rotate the collar in a counterclockwise direction (as viewed in FIG. 3). This rotation of the collar 23 is transmitted through the clutched drive mechanism 17 to rotate the inner sleeve 19 with the collar under the influence of force transmitted from the bar 15**.

When the bar 15 is moved in an upward direction (as viewed in FIG. 2 and indicated by the arrow B) during opening of the lid 19, the opposite side surfaces **15*a* and 15*b* (FIG. 3) on the bar 15 are pressed against the side surfaces 24*a* and 24*b* of the slot 24 to transmit drive forces from the bar to the collar 23. These drive forces pull the collar 23 upward and are effective to rotate the collar in a clockwise direction (as viewed in FIG. 3). This rotation of the collar is not transmitted through the clutched drive mechanism 17 and is ineffective to rotate the inner sleeve 19 with the collar. This is because the drive mechanism 17** is a one-way clutched drive mechanism.

Counterclockwise rotation (as viewed in FIG. 3) of the collar 23 and inner sleeve 19 relative to the casing 18 causes the viscous damping medium 20 to generate a damping torque. This damping torque is the result of a shearing action caused by rotation of a cylindrical film adjacent to the cylindrical radially outer side surface of the sleeve 19 relative to a stationary cylindrical film adjacent to the cylindrical radially inner side surface of the stationary casing 18. The damping torque resists relative rotation between the casing 18 and inner sleeve 19 to prevent the lid 12 from slamming shut This results in a relatively slow or gentle closing of the lid 12.

The one-way clutched drive mechanism 17 is arranged to allow drive forces to be delivered from the bar 15 to the damper 13 in only one direction of movement of the bar (arrow A). For this, the collar 23 and inner sleeve 19 are provided with a series of complementary opposed ramped teeth 25, 26 respectively, in the manner of a dog clutch. The teeth 25 are integrally formed as one piece with the collar 23.

Similarly, the teeth 26 are integrally formed as one piece with the sleeve 19. However, the teeth 25 and/or 26 may be formed separately and connected with the collar 23 and/or sleeve 19.

Figure 2A:
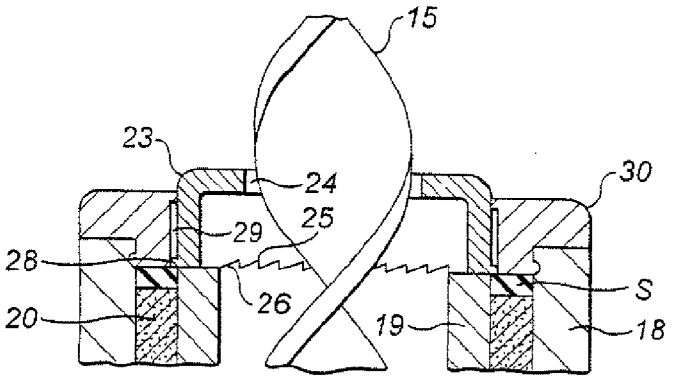
FIG. 2A is a fragmentary schematic illustration of the clutched drive mechanism of FIG. 2 in an engaged condition.
Figure 2B:
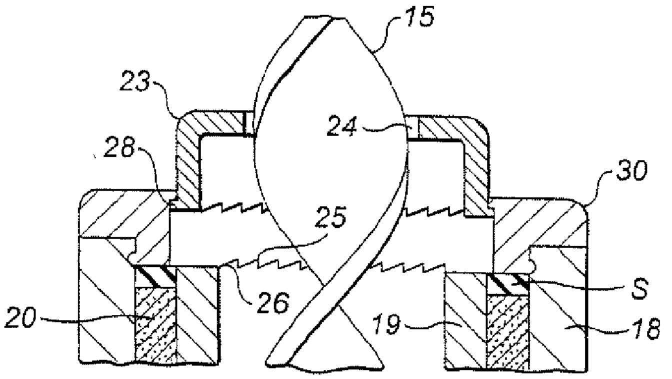
FIG. 2B is a fragmentary schematic illustration of the clutched drive mechanism of FIG. 2 in a disengaged condition.

Rotation of the collar 23 in one direction will drive the sleeve 19 to rotate as the respective teeth 25, 26 of the dog clutch engage (FIG. 2A), whilst rotation of the collar in the opposite direction will not drive the sleeve to rotate, as the teeth of the dog clutch do not engage (FIG. 2B). The clutched one-way drive mechanism 17 here is arranged so that the clutch collar 23 will be engaged (FIG. 2A) to drive the sleeve 19 during closing movement of the lid 12 (i.e. movement of the bar 15 in the direction of arrow A of FIG. 2), whilst drive is disengaged during its opening movement (arrow B). By this arrangement, the assembly 10 exerts no damping effect on the lid 12 when it is opened, but acts to damp its movement as it closes.

If desired, the clutched drive mechanism may be constructed so as to rotate the inner sleeve 19 relative to the casing 18 during at least a portion of the opening movement of the lid 12. This may be accomplished by forming the teeth 25 and 26 with a different configuration so that they can transmit rotary motion in two directions (clockwise and counterclockwise) rather than a single direction (counterclockwise as viewed in FIG. 3). Alternatively, the clutched drive mechanism 17 may be provided with two sets of teeth, that is, one set of teeth to transmit motion in a first direction and another set of teeth to transmit motion in a second direction.

The bar 15 is moved downward, that is, in the direction of the arrow A in FIG. 2, to operate the clutch in the drive mechanism 17 to an engaged condition (FIG. 2A) upon initiation of closing movement of the lid 12. Therefore, force is transmitted from the bar 15 to engage the clutch in the drive mechanism 17 so that the teeth 25 and 26 are engaged (FIG. 2A). At this time, an annular flange 28 on the collar 23 is spaced from an annular flange 29 disposed on a cap 30 which is fixedly connected to the casing 18. Rotational force (torque) is transmitted from the bar 15 to operate the damper 13 to resist closing movement of the lid 12.

Upon initiation of opening movement of the lid 12, the bar 15 is moved upward, in the direction of the arrow B in FIG. 2. This results in an upward force being transmitted from the bar 15 to the drive mechanism 17 to operate the clutch in the drive mechanism to a disengaged condition (FIG. 2B). As this occurs, the flange 28 on the collar 23 moves upward toward the flange 29 on the cap 30. The annular arrays teeth 25 and 26 of the disengaged clutch are axially separated so that the bar 15 and drive mechanism 17 are ineffective to transmit rotational force to the damper 13. Therefore, the damper 13 does not resist opening movement of the lid 12.

When the annular flange 28 on the collar 23 engages the coaxial annular flange 29 on the cap 30 (FIG. 2B), further upward movement of the collar 23 is blocked. Continuing upward movement of the bar 15 rotates the collar 23, in a clockwise direction as viewed in FIG. 3. This results in the flange 28 on the collar 23 sliding along the flange 29 on the cap 30. At this time, the annular arrays of teeth 25 and 26 are axially separated so that the sleeve 19 does not rotate relative to the casing 18.

Upon subsequent initiation of movement of the lid 12 from the open condition toward the closed condition, a downward force (in the direction of the arrow A in FIG. 2) is transmitted from the bar 15 to the drive mechanism 17. This downward force is effective to move the clutch teeth 25 downward into engagement with the clutch teeth 26. As this occurs, the clutch in the drive mechanism is operated from the disengaged condition of FIG. 2B to the engaged condition of FIG. 2A.

During continued closing of the lid 12, downward force in the direction of the arrow A in FIG. 2) is transmitted from the bar 15 to the drive mechanism 17 to maintain the clutch in the engaged condition of FIG. 2A. At the same time, downward movement of the bar 15 results in the helical twists 21 applying force against the side surfaces 24*a* and 24*b* of the slot 24 to rotate the collar 23 in a counterclockwise direction as viewed in FIG. 3. This rotational movement of the collar 23 is transmitted through the clutch teeth 25 on the collar to the clutch teeth 26 on the sleeve 19 of the damper 13.

The bar 15, in this embodiment, is conveniently formed from a standard piece of metal bar, bent to shape. It will be appreciated, however, that other designs could equally well be used for this element. For example, the element could be formed of moulded or extruded plastics and/or have some other cross-sectional shape such as circular, square, triangular, star-shaped or oval. In essence, this element could be of any suitable material. The bar 15 may have any desired cross-section, provided that it is able to deliver rotational drive to the collar. The slot in the collar will of course be suitably shaped to match the cross-sectional shape of the bar element in order to convert its linear movement into rotational movement of the collar.

Figure 4A:
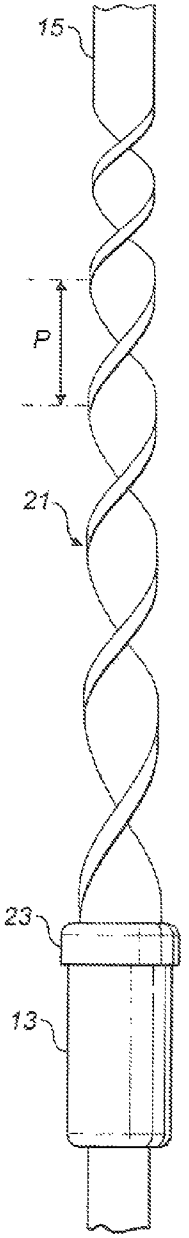

The amount of damping that a rotary shear damper produces generally varies in dependence upon its speed of rotation. The helical twists 21 formed in the bar 15 may be configured in a variety of different ways to, give different damping effects. In the embodiment of FIG. 4*a*, the pitch of the helical twists 21 is varied along the length of the bar 15 so as to produce a variable rate of rotation of the damper 13, and hence a variable damping resistance (the pitch P being the distance between corresponding points on successive twists of the bar, as illustrated in FIG. 1). A shorter pitch P of the helical twists 21 will cause a faster rate of rotation of the collar 23, and hence a greater damping force, whereas a larger pitch will have the opposite effect.

The collar 23 (FIG. 2) has a thickness designated t. The thickness t of the collar 23 is equal to the extent of the slot 24 in the collar along the bar 15. The thickness t of the collar 23 is substantially less than the pitch of the helical twists formed in the bar 15. The thickness t of the collar 23 is less than one half the pitch of the helical twists in the bar 15. In the illustrated embodiment of the invention, the thickness t of the collar 23 is approximately one tenth (1/10) the pitch of the helical twists in the bar 15. By having the thickness t of the collar 23 less than one half (1/2) the pitch of the helical twists in the bar 15, any tendency for jamming of the helical twists on the bar 15 in the slot 24 in the collar 23 is minimized.

In the linen chest application shown in FIG. 1, the lid 12 will tend to accelerate as it closes, due to the effect of gravity. Thus, the assembly could be tailored to produce a steadily increasing amount of damping resistance to counteract this by gradually decreasing the pitch P of the twists 21 over the length of the bar 15. This variant is illustrated in FIG. 4*a*.

As the lid 12 moves from a fully open position to a closed position, the center of gravity CG of the lid moves away from the pivot axis of the hinge H (FIG. 1) toward an opposite side 11*a* of the chest 11. As this occurs, the force urging the bar 15 downward (as viewed in FIGS. 1 and 4*a*) gradually increases. Since the pitch P (FIG. 4*a*) of the portion of the helical twist on the bar 15 which engages the slot 24 (FIG. 2) in the collar 23 decreases as the bar 15 moves downward (as viewed in FIG. 4*a*), the rate of at which the helical twists on the bar causes the collar to rotate with each increment of downward movement of the bar increases.

Increasing the rate of rotation of the collar 23 with each increment of downward movement of the bar 15 increases the rate of rotation of the inner sleeve 19 relative to the casing 18 with each increment of downward movement of the bar 15. Increasing the rate of rotation of the inner sleeve 19 relative to the casing 18 increases the resistance provided by the viscous damping medium 20 to relative rotation between the inner sleeve and casing. Therefore, as the downward force transmitted from the lid 12 to the bar 15 increases the resistance provided by the damper 13 increases. This results in the rate at which the lid 12 moves toward the closed position remaining substantially constant.

Figure 4B:
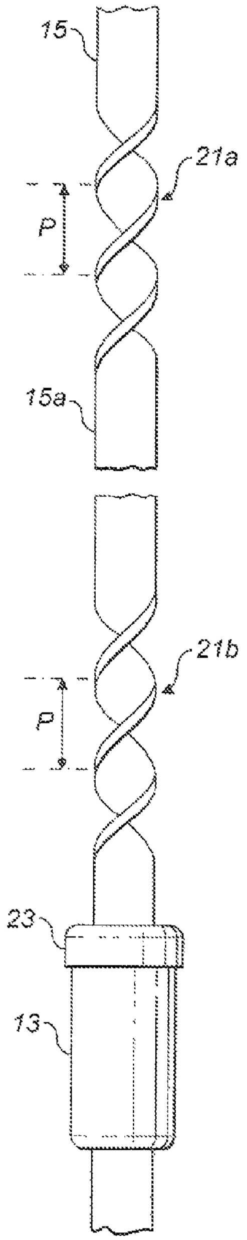
Figure 4C:
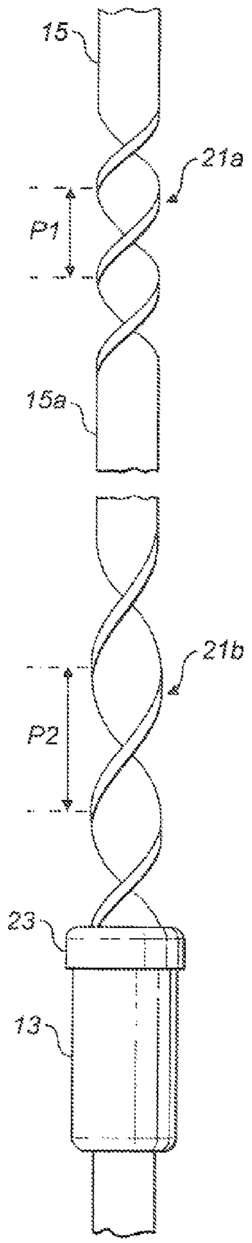

Another possible variation would be for the bar 15 to be formed with two discrete sections of helical twists 21*a* and 21*b* (FIG. 4*b*) separated by a plain section so as to produce an intermittent rotation of the collar 23 and hence an intermittent damping resistance. Such a variant is illustrated in FIG. 4*b* and here, each section of helical twists 21*a*, 21*b* has the same pitch P. A modified form of this variant is illustrated in FIG. 4*c* and here, the two sections of helical twists 21*a*, 21*b* have different pitches P1 and P2. A further possibility (not shown) would be for the separate sections of the helical twists 21*a*, 21*b* to be oriented in opposite directions. The effect of this would be for the bar 15 to cause rotation of the collar 23 first in one direction and then in the opposite direction as it moves relative to the collar.

Other variants could be achieved by providing separate clutched drive mechanisms 17 at either end of the damper 13 working in opposite rotational senses. The helical twists 21 in the bar 15 would then be configured and arranged so as to act with respective collars 23, one at one end of the damper 13 to produce damping during a chose range of movement of the bar 15 in one direction, and the other at the other end of the damper 13 to produce damping during a chosen range of movement of the bar in the opposite direction.

Other options for varying the configuration of the assembly are also possible. It will be noted, for example, that the bar 15 could be arranged to cooperate with two or more dampers 13 in series, rather than just the one shown in the drawings. This could be used to increase the amount of effective damping resistance that the assembly is able to generate, making it suitable for use in heavier duty applications.

It will also be appreciated that by adjusting the geometry of the arrangement, i.e. in this case the positioning of the pivotal mountings 14 and 16 relative to each other and to the hinge of the lid 12 itself, the same basic assembly could be used to cater for a range of different situations, in particular, catering for movable members of different sizes and weights.

It will be further understood that the assembly could be readily adapted to provide movement control in any number of different situations where one member is movable relative to another including, for example, doors, drawers and drop-down flaps.

When the lid 12 is moved from a closed position toward an open position, the damper 13 is ineffective to provide resistance to movement of the bar 15. This is because, when the bar 15 is moved upward (as viewed in FIG. 2) relative to the damper 13, the clutched drive mechanism 17 is disengaged (FIG. 2B). This renders the clutched drive mechanism 17 ineffective to rotate the inner sleeve 19 relative to the casing 18. As the bar 15 is moved upward, the collar 23 tends to move upward with the bar 15 so that the teeth 25 and 26 are partially or fully disengaged. As the bar 15 moves upward, the helical twist on the bar rotate the collar in a clockwise direction (as viewed in FIG. 3). Therefore, if the teeth 25 on the collar 23 engage the teeth 26 on the inner sleeve 19, the teeth 25 on the collar 26 slide along sloping sides or ramps on the teeth 26 on the inner sleeve 19. This results in the transmission of very little or no force between the collar 23 and inner sleeve 19.

As was previously mentioned, the damper 13 is pivotally mounted on the chest 11 by means of a bracket 14 (FIGS. 1 and 2). This enables the damper 13 to pivot, relative to the chest 11, in a counterclockwise direction, indicated by an arrow 13*a* in FIG. 1, as the lid 12 is moved toward the fully open position. The damper 13 pivots, relative to the chest 11, in a clockwise direction, indicated by an arrow 13*b* in FIG. 1, as the lid 12 is moved toward the fully closed position.

To accommodate pivotal movement of the damper 13, a pivot shaft 18*a* (FIG. 2) is fixedly connected to the casing 18. The pivot shaft 18*a* is rotatably supported by bearings 14*a* mounted on the bracket 14. The damper 13 is pivoted relative to the chest 11 by force transmitted from the bar 15 to the clutched drive mechanism 23.

When the lid 12 is moved toward the fully closed position, force is transmitted from the bar 15 to side surfaces 24*a* and 24*b* (FIG. 3) of the slot 24 in the collar 23. This force pivots the damper 13 in the direction of the arrow 13*b* in FIG. 1. As this occurs, the angular orientation of the damper 13 relative to the chest 11 changes. As the damper 13 is pivoted in the direction of the arrow 13*b* in FIG. 1, the coincident central axes of the damper 13 and bar 15 approach a parallel relationship with the inner side surface of the lid 12.

When the lid 12 is moved toward the fully open position, force is transmitted from the bar 15 to side surfaces 24*a* and 24*b* (FIG. 3) of the slot 24 in the collar 23. This force pivots the damper 13 in the direction of the arrow 13*a* in FIG. 1. As occurs, the angular orientation of the damper 13 relative to the chest 11 changes. As the damper 13 is pivoted in the direction of the arrow 13*a* in FIG. 1, the coincident central axes of the damper 13 and bar 15 moved toward an orientation in which they slope upwardly and rearwardly.

The damper 13 is pivotal about an axis which extends transverse to the central axis of the bar 15. In the illustrated embodiment of the invention the damper 13 is pivotal about an axis which extends perpendicular to and intersects the central axis of the bar 15. In the illustrated embodiment of the invention, the axis about which the damper 13 pivots perpendicular to and intersects coincident central axes of the casing 18 and sleeve 19.

Figure 5:
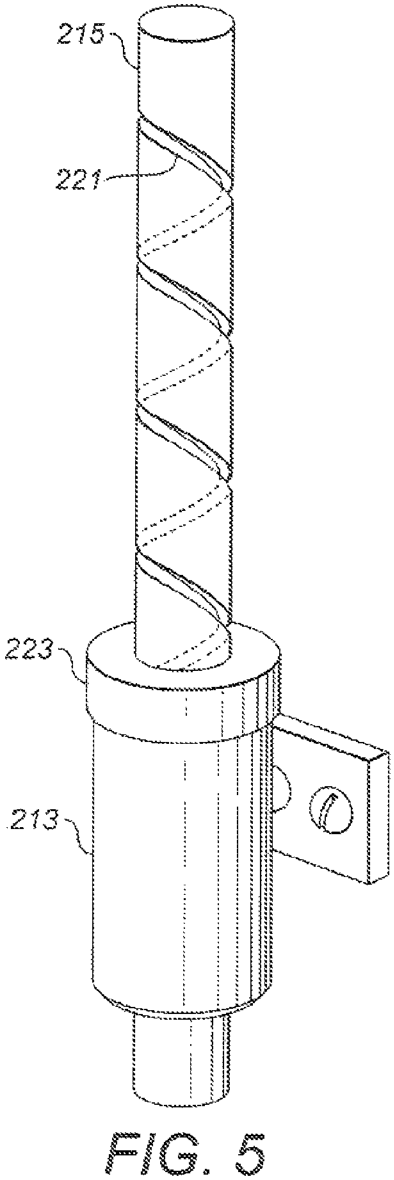
FIG. 5 illustrates another form of movement control assembly according to the invention.
Figure 6:
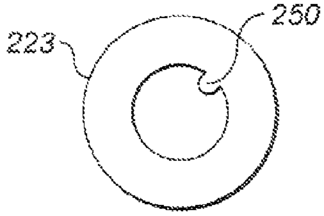
FIG. 6 is a detail view of the rod and collar of the assembly of FIG. 5.

The damping assemblies described above are conveniently designed to work with standard forms of rotary shear damper. However, the assemblies can be modified in many other ways, whether to work with standard or non-standard forms of damper. For example, as seen in FIGS. 5 and 6, the movement converting mechanism could take the form of a round section rod 215 (FIG. 5) formed with a helically extending groove 221 around its outer surface, instead of the bar described above. The rod 215 extends through the bore of the damper 213. In this case, the collar 223 has an inwardly extending lug 250 (FIG. 6) to engage in the helical groove 221. As before, the collar 223 is arranged to drive the inner sleeve of the damper, preferably via one-way clutch mechanism. When the rod 215 moves longitudinally (and non-rotatably) relative to the damper 213, the collar 223 will drive the inner sleeve of the damper to rotate through the interaction of the lug 250 in the groove 221, thus providing damped resistance to the movement of the rod. As with the embodiments described above, the groove 221 in the rod 215 effectively defines a helically extending camming track, with the lug 250 in the collar 223 acting as a cam follower. Again, it will be noted that the thickness of the lug 250 in the longitudinal direction of the rod is designed to be significantly smaller than the pitch of the helical groove 221. This allows the possibility for the pitch of the groove 221 to be varied along the length of the rod 215 to give different damping actions in the same way as the variants described above.

Figure 7:
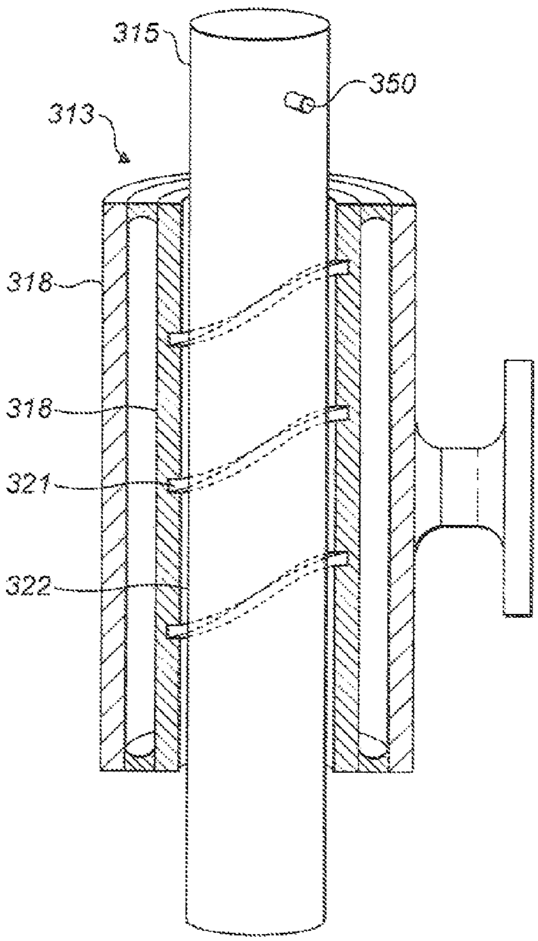
FIG. 7 illustrates a further form of movement control assembly according to the invention.

FIG. 7 illustrates another modified form of assembly in which the elements of the movement converting mechanism are provided the opposite way round. That is to say, the inner sleeve 319 of the damper 313 is provided with a groove 321 extending helically around its inner surface, whilst the elongate element takes the form of a round section rod 315 with an outwardly projecting pin 350. In this case, the rod 315 extends through the bore 322 of the damper 313, whilst the pin 350 engages the helical groove 321. When the bar 315 moves longitudinally (an non-rotatably) relative to the damper 313, the engagement of the pin 350 in the helical groove 321 will cause the inner sleeve 319 to rotate, thus providing damped resistance to the movement of the rod.

In this arrangement, the groove 321 in the inner sleeve 319 effectively defines a helically extending camming track, whilst the pin 350 on the rod 315 acts as a cam follower. Thus, with the rod 315 being prevented from rotating, relative linear movement between the pin 350 and groove 321 causes relative rotational movement between them. In this arrangement it will be noted that the size of the pin 350 in the longitudinal direction of the rod 315 is significantly less than the pitch of the helical twists in the groove 321. This again allows the possibility for the pitch of the helical twists in the groove 321 to be varied along the length of the rod 315 to give different damping actions in the same way as the variants described above.

Figure 8:
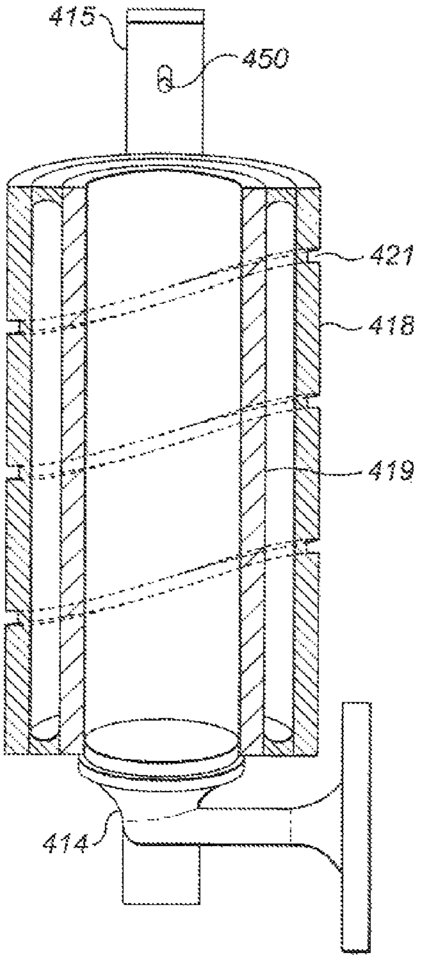
FIG. 8 illustrates a yet further form of movement control assembly according to the invention.

A further form of assembly is seen in FIG. 8. Here, the damper 413 has a groove 421 extending helically around the external surface of its outer cylinder 418. The inner cylinder 419 of the damper 413 in this case is mounted stationarily by means of a suitable bracket 414. The elongate element in this case takes the form of a plain bar 415. This has an outwardly projecting pin 450 which is designed to engage the helically extending groove 421 on the damper 413. When the bar 415 moves longitudinally relative to the damper 413, its outer cylinder 418 will be caused to rotate by the action of pin 450 engaging in the groove 421. With the inner cylinder 419 of the damper 413 being held stationary, this actuates the damper, which thus provides a damped resistance to the movement of the bar. Again, the damping action in this arrangement can be tailored in the same way as the variants described above, by ensuring that the pin 450 is small compared with the smallest pitch of the helical groove.

Other arrangements will be understood to be possible. In each case, however, the essential point of the movement converting mechanism is that it 15, comprises on the one hand an element with a helically extending camming track and on the other hand an element with a cam follower to engage the track, so that the longitudinal movement of one element will cause rotational movement of the other. The other critical feature of the movement converting mechanism is the manner of engagement between the camming track and cam follower: this is designed to occur over a contact area whose length (in the direction of longitudinal movement) is less than the (smallest) pitch of the helical twists in the camming track. This allows the mechanism to be capable of operating with any amount of variation in the pitch of the helical twists over the length of the track.

Having described the invention, the following is claimed:

1. An assembly controlling relative movement between a first member and a second member in a piece of furniture, said assembly comprising:

a rotary shear damper and a drive mechanism;

said rotary shear damper includes a casing connected with said first member, a rotor connected with said drive mechanism, and a working chamber containing a viscous damping medium, said working chamber being at least partially disposed between an interior surface of said casing and an exterior surface of said rotor, the surfaces of said working chamber being exposed to the viscous damping medium;

said drive mechanism includes an elongated drive element which is connected with said second member, said elongated drive element extends through said casing and said rotor of said rotary shear damper, said elongated drive element having a series of helical twists, and a clutch collar which engages said helical twists and transmits force from said elongated drive element to said rotor to rotate said rotor relative to said casing and to shear the viscous damping medium in said working chamber to provide a resistive force which resists relative movement between said first and second members, said clutch collar being movable relative to said rotor and said drive element;

said rotor having a first annular array of teeth which extend around said elongated drive element, said clutch collar having a second annular array of teeth which extends around said drive element, said clutch collar being movable between an engaged condition in which said second annular array of teeth is engaged with said first annular array of teeth, the engaged condition transmits force from said elongated drive element through said clutch collar to said rotor, and a disengaged condition in which said second annular array of teeth is spaced from said first annular array of teeth, the disengaged condition is ineffective to transmit force, said clutch collar being movable between the engaged condition and the disengaged condition under the influence of said drive element.

2. An assembly as set forth in claim 1 wherein said series of helical twists on said elongated drive element have pitches which decrease along the length of said elongated drive element in such a manner as to increase the rate of rotation of said rotor relative to said casing and the rate of shearing of the viscous damping medium in said working chamber as the resistive force increases.

3. An assembly as set forth in claim 1 wherein said clutch collar engages said series of helical twists for a drive engagement distance along a longitudinal axis of said elongated drive element, said drive engagement distance being less than half of a pitch of said helical twists.

4. An assembly as set forth in claim 1 wherein said series of helical twists have a uniform pitch.

5. An assembly as set forth in claim 1 wherein a pitch of the helical twists at a first location along said series of helical twists is different than a pitch of the helical twists at a second location along said series of helical twists.

6. An assembly as set forth in claim 1 wherein said series of helical twists includes first and second groups of helical twists disposed at spaced apart locations along said elongated drive element, said first and second groups of helical twists being separated by a length of said elongated drive element which is free of helical twists.

7. An assembly as set forth in claim 6 wherein said first and second groups of helical twists have the same pitch.

8. An assembly as set forth in claim 6 wherein said first and second groups of helical twists have different pitches.

9. An assembly as set forth in claim 1 wherein said rotor in said rotary shear damper is rotatable about a longitudinal central axis of said elongated drive element.

10. An assembly as set forth in claim 1 wherein the engaged condition of said clutch collar causes said rotor to rotate in a first direction relative to said casing, said clutch collar being ineffective to rotate said rotor in a second direction which is opposite from said first direction.

11. An assembly as set forth in claim 1 wherein said clutch collar, and said casing, rotor and working chamber of said rotary shear damper have coincident central axes.

* * * * *